June 30, 1964     C. A. HERBST     3,139,010
HYDRAULIC BRAKE PLUNGER AND METHOD OF MAKING SAME
Filed Aug. 8, 1961
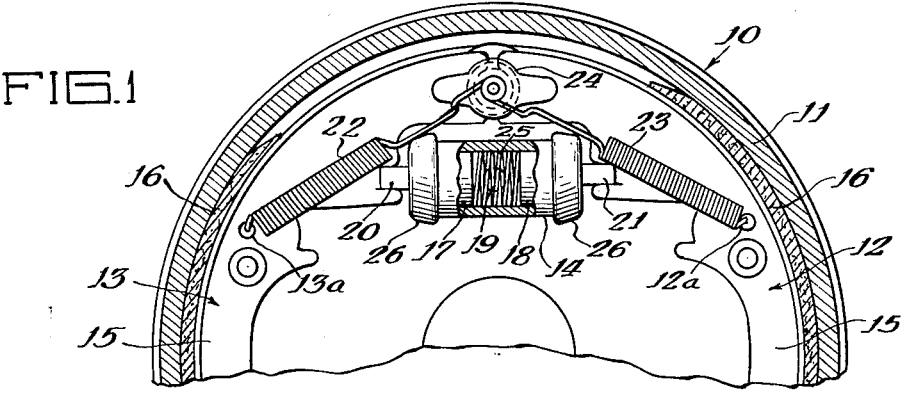
Inventor:
Clarence A. Herbst

United States Patent Office 3,139,010
Patented June 30, 1964

3,139,010
HYDRAULIC BRAKE PLUNGER AND METHOD OF MAKING SAME
Clarence A. Herbst, Park Ridge, Ill., assignor to Resinoid Engineering Corporation, a corporation of Illinois
Filed Aug. 8, 1961, Ser. No. 130,129
8 Claims. (Cl. 92—248)

This invention relates to pistons and more particularly to pistons for use with hydraulic brake systems.

Pistons for hydraulic devices such as hydraulic brake pistons have heretofore been made of metal and flexible rubber, rubber compositions or plastic materials surrounding a metallic core. Such pistons are not entirely satisfactory for various reasons. The metal pistons have a tendency to score the piston bore thereby relieving the hydraulic pressure and causing leaks. Pistons made of plastic materials have not been satisfactory for reason of lacking mechanical strength to resist required hydraulic pressures. The piston of this invention overcomes all of these disadvantages.

The piston of this invention is made up of a plastic body and a metal head. The metal head is pre-shaped to receive the hemispherical end of a brake shaft and the hemispherical recess in the metal head is prestressed to an amount equal to the elastic limit of the metal so that it takes a permanent set. The amount of force necessary to prestress is greater than the amount of pressure that the piston will experience in operation, and therefore, additional elongation of the recess in the metal head in use becomes impossible, preventing fracture of the plastic body.

It is therefore an object of this invention to provide a piston such as that described above.

It is yet another object of this invention to provide a piston which has a low coefficient of friction and will prevent scoring of the piston bore.

It is still a further object of this invention to provide a composite piston which will not become separated during operation.

It is yet a further object of this invention to provide a piston comprising a molded body of plastic material and a metal head integral with the body, the head being produced from a metal capable of taking a permanent set and the head having been prestressed an amount equal to or greater than its elastic limit but less than its maximum tensile strength.

Other objects and advantages of the invention will become apparent from the following description taken together with the accompanying drawings.

Of the drawings:

FIGURE 1 is a partial front elevational view of a brake cylinder partially broken away to expose the piston of this invention;

FIGURE 2 is a top plan view of the metal head of the piston;

FIGURE 3 is a sectional view taken along the line 3—3 of FIGURE 2;

FIGURE 4 is a sectional view of a prestressing apparatus and the piston head of this invention prior to prestressing of the piston;

FIGURE 5 is a sectional view similar to FIGURE 4 showing the piston head being prestressed;

FIGURE 6 is a top plan view of the piston of this invention; and

FIGURE 7 is a sectional view taken along the line 7—7 of FIGURE 6.

Referring now to FIGURE 1, a brake assembly 10 is shown including a brake drum 11, brake shoes 12 and 13 and a hydraulic cylinder 14 for moving the shoes into frictional contact with the drum to oppose rotation of the drum. The brake shoes 12 and 13 are identical in construction, each having a web portion 15 and a friction lining 16 riveted thereto. An adjustable strut (not shown) connects the shoes 12 and 13 at their bottom ends to allow movement of the shoes toward the brake drum 11 under pressure from the hydraulic cylinder 14.

The hydraulic cylinder 14 is shown in FIGURE 1 placed between the other ends of the brake shoes 12 and 13 and arranged to move the shoes into engagement with the drum 11. The cylinder 14 is provided with a pair of pistons 17 and 18 reciprocal in the cylinder. Upon admission of fluid from the hydraulic system through the opening 19 into the interior of the cylinder 14, the pistons 17 and 18 are moved outward. Through the shafts 20 and 21 they contact the shoes 12 and 13 and move them outward. Return springs 22 and 23 are attached to the shoes 12 and 13 by means of openings 12a and 13a and are attached to the brake drum by means of the fitting 24. These springs serve to return the ends of the shoes to the brake released position when the pressure in the hydraulic system is relieved.

Another spring 25 is positioned between the pistons 17 and 18 and serves to maintain them in a separated but unloaded condition. A pair of caps 26 retain the pistons 17 and 18 in the cylinder 14, the caps having openings to allow the passage of the shafts 20 and 21.

Pistons 17 and 18 are of exactly the same construction so that only one will be described for the purposes of this invention. For this description, FIGURES 6 and 7 are of particular interest. FIGURE 7 shows a sectional view of a piston 17 which includes a body 27 and a head 28. The head is formed with a cup-shaped depression 28a which is accentuated in a manner yet to be described. The body is of a cylindrical shape as seen in FIGURE 6 and the head 28 is circular in plan.

As mentioned earlier in the specification, pistons composed of metal elements and plastic bodies have not been successful in the past since elongation of the metal element under stress, caused by the actuation of the brake elements under hydraulic pressure, has caused cracking of the plastic body. The piston of this invention avoids this difficulty through prestressing of the metal of the head 28 which is molded integrally with the body 27. The head is constructed of a metallic material which is capable of taking a permanent set. The head is prestressed prior to molding an amount equal to or greater than its elastic limit to provide this permanent set but less than its maximum tensile strength.

One of the physical properties of many metals is that of being able to take a permanent set. When a stress or force is put upon a metal body as, for example, if a bar of wrought iron is made to support a heavy weight, it will stretch. This stretch is called strain. If the heavy weight is removed, the bar will normally return to its original length. However, if the bar is loaded with a heavier weight which causes the bar to stretch, so that when the bar is unloaded it will not return to its original length, it is permanently elongated or has taken a permanent set. The elastic limit of a body is the force necessary to produce the first permanent set. It is usually measured in pounds per square inch. Another way of explaining the elastic limit is to say it is the point beyond which the strain is not proportional to the stress.

As already mentioned, many materials are capable of this physical property, i.e., taking a permanent set. Predominant among these are the ferrous metals such as iron and steel. Softer materials such as gold, of course, are not under most circumstances capable of this type of property.

In discussing physical properties of metals, of course, the tensile strength of the metal must be kept in mind. This is the resistance to being pulled apart. It is also measured in pounds per square inch and is substantially greater than the elastic limit of the metal. Thus for example, in carbon steel the yield point or elastic limit is 28,000 pounds whereas the tensile strength of this steel is 56,000 pounds. This is important since obviously, the tensile strength of the metal used in producing the piston head cannot be exceeded in prestressing the steel. The following table gives other usable metals with their elastic limit and tensile strength.

| Type of metal: | P.s.i. |
|---|---|
| Machine steel— | |
| Tensile strength | 60,000 |
| Elastic limit | 40,000 |
| Cold rolled steel— | |
| Tensile strength | 75,000 |
| Elastic limit | 38,000 |
| Standard steel .4% carbon quenched— | |
| Tensile strength | 95,000 |
| Elastic limit | 62,000 |

In producing the piston head 28, it is formed into the shape shown in FIGURES 2 and 3 which is actually a conical shape. The head is then placed in the holder 29 shown in FIGURES 4 and 5 for prestressing. This holder has a cup-shaped portion 29a and an opening 29b. A cylindrical shaft 30 with a hemispherical end 30a is pressed against the base 28a of the head as shown in FIGURE 5 and force is applied to prestress the section 28a. Technically, only the center section 28a and the head 28 is prestressed in this manner since it is unnecessary to stress the entire head.

The prestressed head is now molded into the piston shape 17 so that the head is held in place by the overlapping portion 27a of the molded piston body. This is done in a conventional mold.

The plastic materials which are usable to provide the molded piston body are quite varied, it being only necessary that they be inert to the hydraulic fluid conventionally used in hydraulic brakes of this type and that they have a coefficient of friction which is low against the metal of the cylinder 14. Numerous thermosetting plastic materials are satisfactory for this purpose. It is desirable, however, that the resulting body have a hardness of from about 80 to about 120 on the Rockwell L scale. Among these are the phenolic resins such as phenol formaldehyde, phenol furfural, and other phenol aldehyde resins. They may be used in a modified or unmodified form. In a modified form certain fillers in an amount of from about 60 to 75% by weight can be included. For example, clay, mica, asbestos, calcium, magnesium and iron silicates, amorphous silica and other fillers may be used. The production of such compounds, their molding and handling are, of course, well known to those skilled in the art.

The foregoing detailed description has been given for clearness of understanding only, and no unnecessary limitations should be understood therefrom, for some modifications will be obvious to those skilled in the art.

I claim:

1. A piston for a hydraulic device having an internal piston receiving bore such as a brake cylinder or the like, comprising: a molded body of substantially nonresilient plastic material; and a metal head integral with said body, said head being produced from a metal capable of taking a permanent set and said head having been prestressed an amount to provide a permanent set at a stress less than maximum tensile strength of the metal.

2. A piston for a hydraulic device having an internal piston receiving bore such as a brake cylinder or the like, comprising: a molded body of substantially nonresilient plastic material having a Rockwell hardness on the L scale of from about 80 to about 120; and a metal head integral with said body, said head being produced from a metal capable of taking a permanent set and said head having been prestressed an amount equal to or greater than its elastic limit but less than its tensile strength.

3. A piston for a hydraulic device having an internal piston receiving bore such as a brake cylinder or the like, comprising: a molded body of a substantially nonresilient hardened synthetic resinous material having a Rockwell hardness on the L scale of from about 80 to about 120; and a ferrous metal head molded integrally with said body, said head having a cup-shaped depression therein and being formed of a ferrous metal capable of taking a permanent set; said head having been prestressed an amount equal to or greater than its elastic limit.

4. A piston for a hydraulic device having an internal piston receiving bore such as a brake cylinder or the like, comprising: an integrally molded body and head; said body being composed of a substantially nonresilient phenolic resin having a hardness on the Rockwell L scale of about 80 to about 120; said head having a cup-shaped depression and being formed of steel which has been prestressed an amount equal to or greater than its elastic limit whereby it has taken a permanent set.

5. The piston of claim 4 wherein said resin contains from about 60 to 75% by weight of an inert filler.

6. A method for producing an integrally molded piston including a plastic body and a metal head, comprising the steps of: forming a metal head of a material capable of taking a permanent set; prestressing said head an amount equal to or greater than its elastic limit but less than its tensile strength; and molding a substantially nonresilient plastic material in piston form about said head.

7. A method for producing an integrally molded piston including a plastic body and a metal head, comprising the steps of: forming a metal head of a ferrous material capable of taking a permanent set; prestressing said head an amount equal to or greater than its elastic limit; and molding a substantially nonresilient plastic material about said head to provide a body in piston form having a Rockwell hardness on the L scale of from about 80 to about 120.

8. A method for producing an integrally molded piston including a plastic body and a metal head, comprising the steps of: forming a steel head having a cup-shaped depression; prestressing said head an amount equal to or greater than its elastic limit whereby it takes a permanent set; and molding a substantially nonresilient phenolic resin about said head to form a body in piston form having a hardness on the Rockwell L scale of from about 80 to about 120.

References Cited in the file of this patent

UNITED STATES PATENTS

| 2,054,863 | Oliver | Sept. 22, 1936 |
| 2,307,671 | Dodge | Jan. 5, 1943 |
| 2,396,386 | Price | Mar. 12, 1946 |
| 2,429,426 | Phillips et al. | Oct. 21, 1947 |
| 2,571,486 | Reynolds | Oct. 16, 1951 |